Dec. 8, 1964 W. A. ROQUEMORE 3,160,123
GRASS PLANTERS
Original Filed March 30. 1961 2 Sheets-Sheet 1

INVENTOR.
William A Roquemore
BY
Harry S. Nesmann
atty.

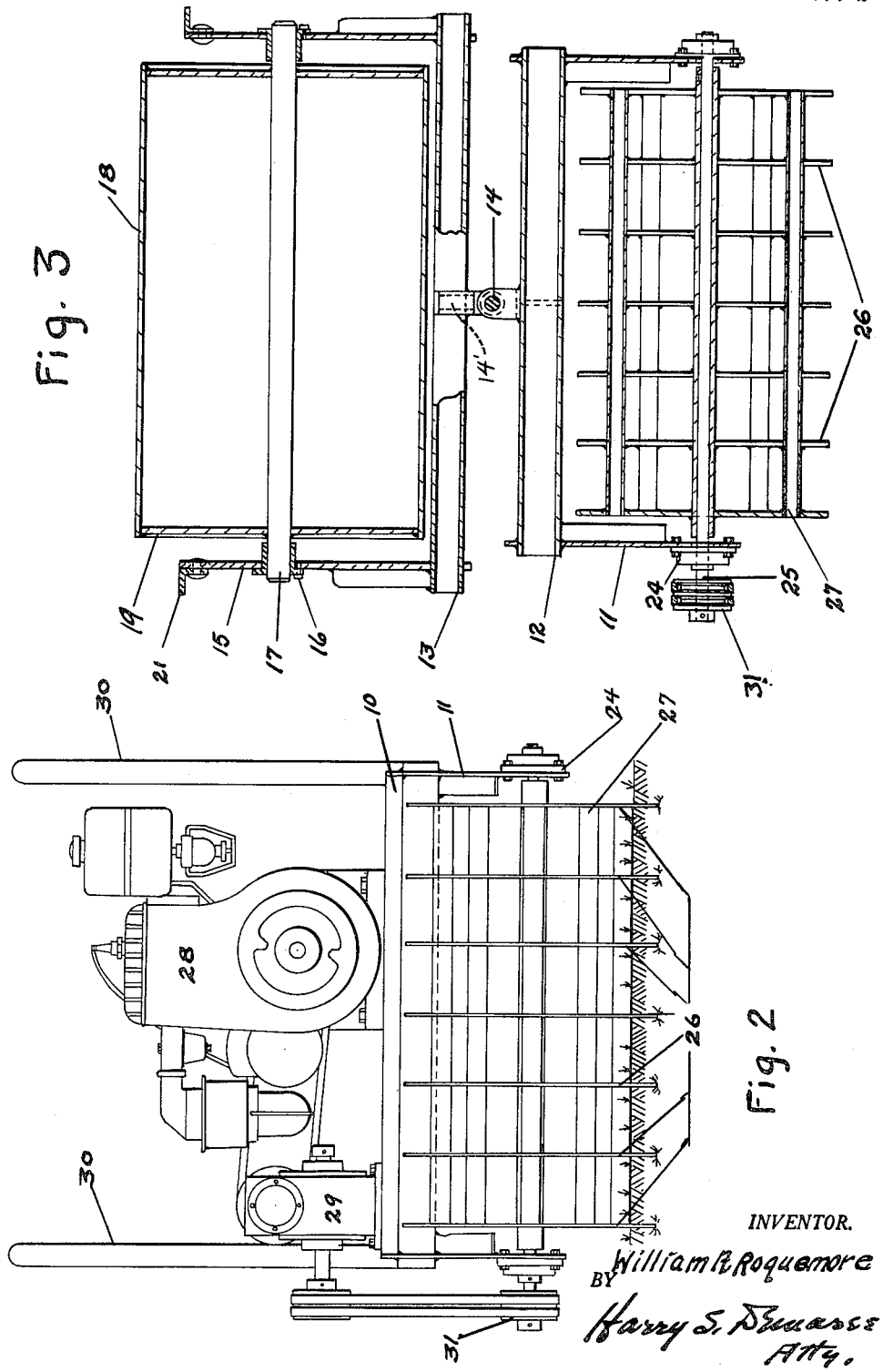

United States Patent Office 3,160,123
Patented Dec. 8, 1964

3,160,123
GRASS PLANTERS
William A. Roquemore, 211 Carrol Lane, Lakeland, Ga.
Continuation of application Ser. No. 99,488, Mar. 30, 1961. This application June 2, 1964, Ser. No. 374,875
2 Claims. (Cl. 111—1)

This application is a continuation of my pending application, Serial No. 99,488, filed March 30, 1961, now abandoned.

The invention relates in general to devices adapted for planting and establishing high quality grass lawns, golf greens, etc., and has for a principal object the provision of a simple and efficient device capable of planting grasses such as hybrid Bermuda grass which is customarily propagated vegetatively by partially embedding sprigs of the grass in a prepared seed bed.

A further object is to provide a device which is also adapted to anchor mulch, such as straw or the like, spread over a prepared bed when grass is propagated from seed, the mulch acting to conserve moisture and protect the seed during its germinating period.

A further object is to provide a self-propelled planter, the weight of which is supported by the operating elements of the device so that wheel tracks highly detrimental to quality lawns such as putting greens, are avoided.

A further object is the provision of a self-propelled planter which obtains the traction necessary for movement by the contact of the embedding elements with the seed bed, and which may be easily controlled to regulate the planting depth according to the condition and nature of the soil and other factors which may make it desirable to vary the planting depth.

These and other detailed objects are obtained by the structure illustrated in the accompanying drawings, in which—

FIG. 2 is a front elevation; and

FIG. 3 is a top plan view taken on line 3—3 of FIG. 1.

Figure 1:
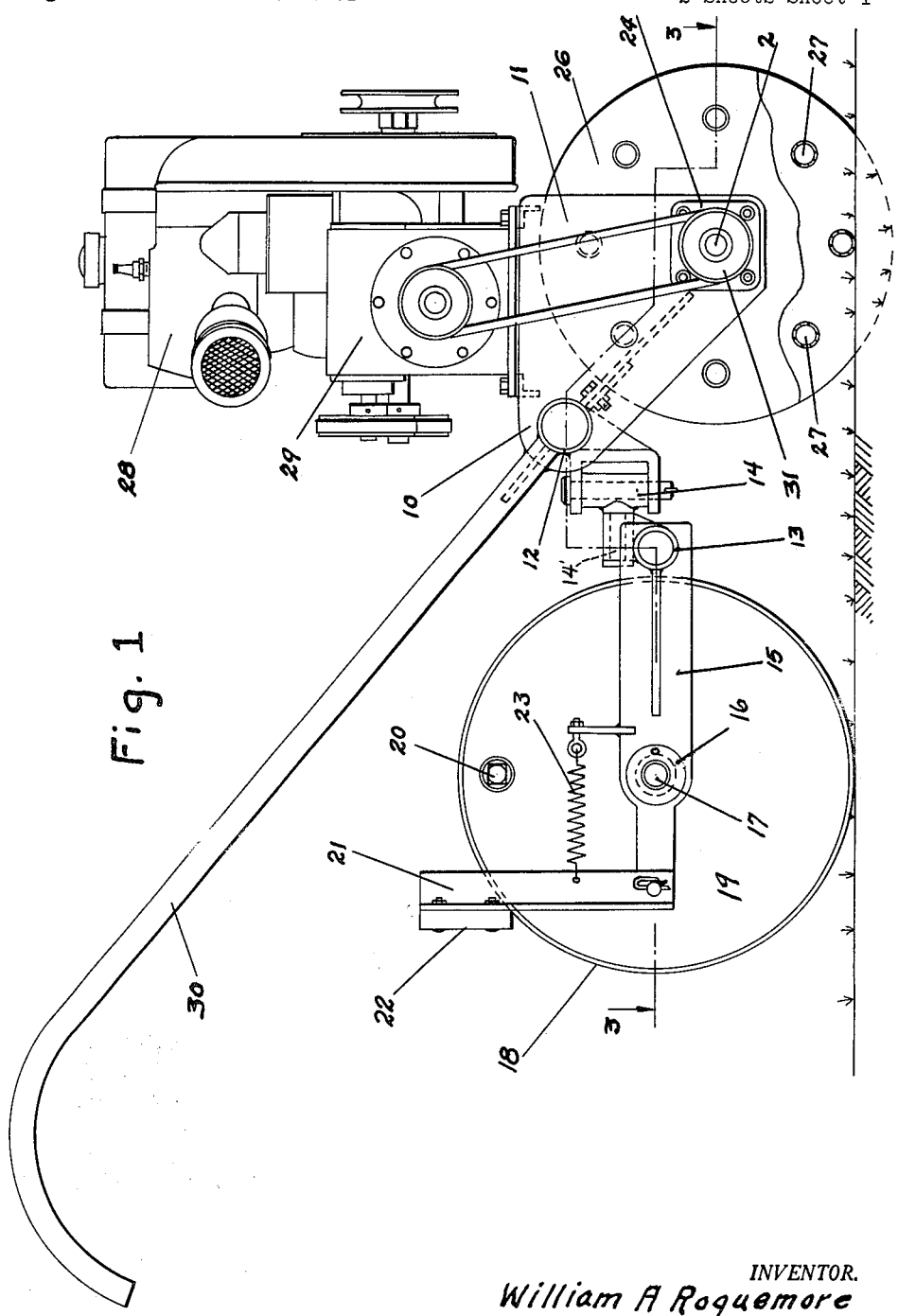
FIG. 1 is a side elevation of a grass planter constructed in accordance with and embodying the present invention.

Referring now by reference characters in the drawings which illustrate a preferred embodiment of the present invention, the grass planter comprises a pair of frames disposed in tandem relation and having an articulated connection therebetween, the leading frame including a horizontal supporting platform member 10 having depending side or end walls 11—11. Rigidly secured to the rear ends of the end walls 11—11 of the leading frame and connecting the same is a rigid horizontal tubular bar 12 which is secured to a second rigid horizontal tubular bar 13 of the trailing frame by a pair of pivotal joints 14 and 14' forming the articulated connection between the leading and trailing frames of the planter. The pivotal axis of the joint 14 lies in a central vertical plane so as to allow steering of the planter, while the joint 14' has its pivotal axis horizontally disposed in a fore-and-aft direction in the central plane of the planter so as to allow independent lateral rocking movement of the frames relative to each other when the planter travels over contoured or irregular ground, but preventing movements of the frames relative to each other in upward and downward directions at the articulated connection between the frames.

At each end of the second horizontal tubular bar 13 is secured a rearwardly extending arm 15. Each arm 15 carries a bearing 16 which receives for rotation the axle 17 of a hollow soil compacting roller 18 having end walls 19—19, one of which is provided with a plugged opening 20 through which water may be injected.

At each rear end of each arm 15—15 a support member 21 is pivotally connected. These support members carry a scraper bar 22 held against the exterior surface of the soil compacting roller 18 by spring 23 to remove debris and soil which may adhere to the roller 18.

The depending end walls 11—11 of the platform 10 are provided with bearings 24 which receive for rotation the axle 25 of the embedding element of the grass planter. This embedding element comprises a series of vertically disposed circular disks 26 held in spaced relation by being secured to the axle 25 and also to a series of tubular spacer members 27—27 which extend the full width of the embedding element in equidistantly spaced relation to each other about the rotary axis of the axle 25 and being radially inwardly spaced from the outer marginal edges of the disks 26.

To provide motive power for the grass planter, an internal combustion engine 28 is mounted on the platform member 10. Power from the engine 28 is transmitted to a pulley 31 secured to the end of axle 25 of the embedding element by conventional transmission means, which in the embodiment shown, consists of a speed reducing gear box 29 and the necessary belts, pulleys, and clutch, the specific details of which form no part of the present invention. For convenience in operating the planter, conventional and well known remote controls for operating the throttle and the clutch can be mounted on the guiding handles 30—30 which are rigidly fastened to the opposite ends of the leading frame and extend rearwardly therefrom to a position beyond the rear of the trailing frame for convenient control by an operator walking behind the roller 18.

When using the planter for establishing vegetatively propagated grasses, a seed bed is prepared and freshly dug sprigs are carefully and uniformly distributed over the surface preferably before the machine is maneuvered over the area by the operator. The weight of the machine, enhanced by the tractive effort of the driven disks, causes the disks to form incisions in the seed bed and to embed a portion of the sprig as the sprigs are engaged by the respective disks into the soil and leaving a portion of the sprig exposed to the air. The soil compacting roller then follows and acts to close up the incisions, compact the soil and level the seed bed. If grass seed is used, the mulch, such as straw customarily used to protect the seed can be anchored to the soil by the use of my planter and prevented from migrating. Wheel tracks such as produced by tractors used to propel other planters and by wheels used to support the weight of other planters are completely avoided by the present invention.

In operating my planter, it can be easily steered by means of the handles 30—30, as allowed by the pivotal joint 14 between the frames. In close quarters or confined areas, as well as at the ends of any planting row, the travel of the planter can be easily and sharply reversed as much as 180° in a space no wider than the width of the planter to start another row immediately adjacent to the previous row, without the need of wide turns and consequent waste of time and effort. This can be achieved by lifting slightly on the handles 30—30 so as to raise the roller 18 out of contact with the soil and thereby allow the entire planter to turn about the forward disk assembly alone while the tractive effort of the latter propels the planter under the guidance of the handles.

By holding back slightly on the handles 30—30, the operator can cause the powered disk assembly to exert greater tractive effort and consequently dig itself deeper into the soil and thus vary the planting depth. This also is advantageous in the case of climbing inclined surfaces where greater than normal tractive effort may be needed. By allowing the disks to dig in deep enough to cause the spacers 27 to engage the soil, the spacers themselves will additionally increase the tractive effort produced by the disk assembly, which is also a great advantage when operating over loose or wet soil, as well as when climbing relatively steep inclines. The spacers 27 also serve to effectively minimize caking of the soil between the disks, which otherwise would seriously interfere with proper embedding of the grass sprigs by preventing the disks from cutting the soil to the required depth. Even when not directly engaged with the ground, the spacers 27 help to break up and clear the soil that may be thrown up between the disks as they rotate while the planter travels over the soil.

Conversely, by exerting a forward pushing force on the handles 30—30, the disks 26 will exert less tractive effort and will penetrate the soil less deeply, with a consequently less depth of embedment of the sprigs proportionate to the degree of pushing force applied to the handles 30—30.

It should be understood that changes and modifications may be made in the grass planter as herein shown and described without departing from the nature and principle of the invention.

I claim:

1. A self-propelled trackless grass planter, comprising a pair of frames disposed in tandem relation and having an articulated connection therebetween, said articulated connection comprising a first pivotal joint having a central vertical pivotal axis allowing steering of said frames and a second pivotal joint having a horizontal pivotal axis lying fore-and-aft between the frames in the central plane thereof and allowing independent lateral rocking movements of the frames relative to each other, the leading frame of the tandem pair having a substantially horizontal supporting platform and a pair of laterally spaced end plates depending therefrom, a transversely extended axle journaled in said end plates, said axle having a plurality of disk-like combined incising and embedding elements fixed thereto in transversely spaced relation to each other and rotatable with said axle in vertical planes, a prime mover mounted on said supporting platform and operatively connected to said axle for rotating the latter and for imparting traction to the tandem frames through the rotary disk-like elements aforesaid, the trailing frame having a pair of laterally spaced rearwardly extended arms, a soil compacting and smoothing roller disposed between said arms and having an axle freely journaled therein on an axis lying transversely of the trailing frame, and a pair of handles rigidly connected to the leading frame and respectively extending from the opposite ends thereof beyond the rear of the trailing frame, said handles being controllable by an operator while walking behind said roller to steer said planter and to control the depth of embedment of prebroadcast grass sprigs responsive to variation of pressure on the handles.

2. A grass planter as defined in claim 1, wherein the rotary disk-like incising and embedding elements are axially separated by spacer elements disposed parallel to the axle thereof at equidistantly spaced positions about the central axis of the disks, with the spacers at each position being extended transversely across the entire width of the disk assembly, but being spaced radially inwardly from the outer margins of the disks so as to be engageable with the soil when the disks have penetrated to a predetermined depth, and thereby increase the tractive effort of the rotary disks.

References Cited by the Examiner
UNITED STATES PATENTS

| 1,592,250 | 7/26 | Yerkes | 111—1 |
| 2,260,110 | 10/41 | Blohm | 172—256 X |
| 2,701,616 | 2/55 | Cooper | 111—3 X |
| 2,887,075 | 5/59 | Linkogel | 111—3 |

ABRAHAM G. STONE, *Primary Examiner.*

WILLIAM A. SMITH III, *Examiner.*